United States Patent
Bohannon et al.

(10) Patent No.: US 10,360,428 B2
(45) Date of Patent: Jul. 23, 2019

(54) FINGERPRINT SENSOR TO SUPPORT WAKE ON FINGER AND NAVIGATION

(71) Applicant: Synaptics Incorporated, San Jose, CA (US)

(72) Inventors: Eric Bohannon, San Jose, CA (US); Mark Pude, San Jose, CA (US); Jeffrey Lillie, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 176 days.

(21) Appl. No.: 15/636,316

(22) Filed: Jun. 28, 2017

(65) Prior Publication Data
US 2019/0005290 A1 Jan. 3, 2019

(51) Int. Cl.
*G06K 9/20* (2006.01)
*G06K 9/00* (2006.01)

(52) U.S. Cl.
CPC .................................. *G06K 9/0002* (2013.01)

(58) Field of Classification Search
CPC ..................................................... G06K 9/0002
See application file for complete search history.

(56) References Cited

U.S. PATENT DOCUMENTS

| 7,787,666 | B2 | 8/2010 | Paloniemi et al. | |
|---|---|---|---|---|
| 8,433,109 | B2 | 4/2013 | Chou | |
| 8,446,382 | B2 | 5/2013 | Goto et al. | |
| 9,195,877 | B2 | 11/2015 | Erhart et al. | |
| 2015/0030217 | A1* | 1/2015 | Wickboldt | G06K 9/00026 382/124 |
| 2015/0077362 | A1 | 3/2015 | Seo | |
| 2015/0135108 | A1 | 5/2015 | Pope et al. | |
| 2016/0188142 | A1* | 6/2016 | Oh | G06F 1/3265 345/174 |
| 2016/0253539 | A1 | 9/2016 | Shen et al. | |
| 2018/0113346 | A1* | 4/2018 | Han | G02F 1/13338 |
| 2018/0113558 | A1* | 4/2018 | Cho | G06K 9/0002 |

* cited by examiner

*Primary Examiner* — Brian Werner
(74) *Attorney, Agent, or Firm* — Leydig, Voit & Mayer, Ltd.

(57) ABSTRACT

An input device for capacitive sensing includes: a plurality of transmitter electrodes and a plurality of receiver electrodes. The input device is configured to: operate in a first mode by driving sensing signals onto each of the transmitter electrodes and receiving separate detected signals corresponding to each of the plurality of receiver electrodes; and operate in a second mode by driving a common sensing signal onto a plurality of the transmitter electrodes and receiving a common detected signal corresponding to at least one receiver electrode selected from the plurality of receiver electrodes.

26 Claims, 10 Drawing Sheets

FINGERPRINT SENSOR TO SUPPORT WAKE ON FINGER AND NAVIGATION

BACKGROUND

Input devices, including touch sensor devices (also commonly called touchpads or proximity sensor devices), as well as biometric authentication devices, are widely used in a variety of electronic systems. Biometric authentication systems, such as fingerprint sensor devices, are used for authenticating users of devices. Among other things, biometric sensing technology provides a reliable, non-intrusive way to verify individual identify for authentication purposes.

Touch sensor devices typically include a sensing region, often demarked by a surface, in which the touch sensor device determines the presence, location and/or motion of one or more input objects, typically for purposes allowing a user to provide user input to interact with the electronic system.

Biometric authentication systems, such as fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens and/or separate sensing areas integrated in mobile devices such as smartphones and tablets).

In some circumstances, such as where minimizing power consumptions is a consideration, a touch sensor and/or fingerprint sensor may be operated in a low power mode and the device may execute a "wakeup" mode when an object is near the sensor. Some solutions utilize additional components and/or circuitry near the sensor to detect the presence of the object to initiate the wakeup.

BRIEF SUMMARY

In an exemplary embodiment, an input device for capacitive sensing includes: a plurality of transmitter electrodes and a plurality of receiver electrodes. The input device is configured to: operate in a first mode by driving sensing signals onto each of the transmitter electrodes and receiving separate detected signals corresponding to each of the plurality of receiver electrodes; and operate in a second mode by driving a common sensing signal onto a plurality of the transmitter electrodes and receiving a common detected signal corresponding to at least one receiver electrode selected from the plurality of receiver electrodes.

In another exemplary embodiment, an input device for capacitive sensing includes: a plurality of transmitter electrodes and a plurality of receiver electrodes. The input device is configured to: operate in a first mode by driving sensing signals onto each of the transmitter electrodes and receiving separate detected signals corresponding to a plurality of differential receivers, wherein each of the plurality of differential receivers is configured to provide a separate detected signal associated with one of the receiver electrodes; and operate in a second mode by driving a sensing signal onto each of the transmitter electrodes and receiving at least one common detected signal at a single-ended receiver, wherein the single-ended receiver is configured to provide a common detected signal associated with at least one receiver electrode.

In yet another exemplary embodiment, a method of operating an input device for capacitive sensing is provided. The input device includes a plurality of transmitter electrodes and a plurality of receiver electrodes. The method includes operating in a first mode, the first mode comprising: driving sensing signals onto each of the transmitter electrodes; receiving separate detected signals corresponding to each of the plurality of receiver electrodes; operating in a second mode, the second mode comprising: driving a common sensing signal onto each of the transmitter electrodes; receiving a common detected signal corresponding to a first group of ganged receiver electrodes.

BRIEF DESCRIPTION OF THE SEVERAL VIEWS OF THE DRAWING(S)

DETAILED DESCRIPTION

The following detailed description is exemplary in nature and is not intended to limit the disclosure or the application and uses of the disclosure. Furthermore, there is no intention to be bound by any expressed or implied theory presented in the preceding background and brief description of the drawings, or the following detailed description.

A solution to providing Wake-On Finger (WOF) and navigation (NAV) using a fingerprint sensor and associated circuitry is described. Some solutions use additional components, such as metal plates, proximate to the fingerprint sensor to detect a WOF event. Such additional components can increase the complexity and cost of the device. The described embodiments reduce the need for changes to the fingerprint sensor. In certain embodiments, receive (RX) electrodes and optionally transmit (TX) electrodes are "ganged" together. The ganged TX electrodes may be driven by a common transmit signal and the ganged RX electrodes may be connected to a common receive circuit, such as an analog front end (AFE). The terms front end and receiver may be used interchangeably. Alternatively, only RX electrodes need be ganged together and the TX electrodes can be separately driven.

In certain embodiments, single-ended circuitry to capture the signal from the RX electrodes is employed. The signal produced via the ganging of electrodes combined with the single-ended circuitry can produce a signal orders of magnitude larger (e.g., roughly 100 times larger) than a differential solution used in certain applications.

Figure 1:
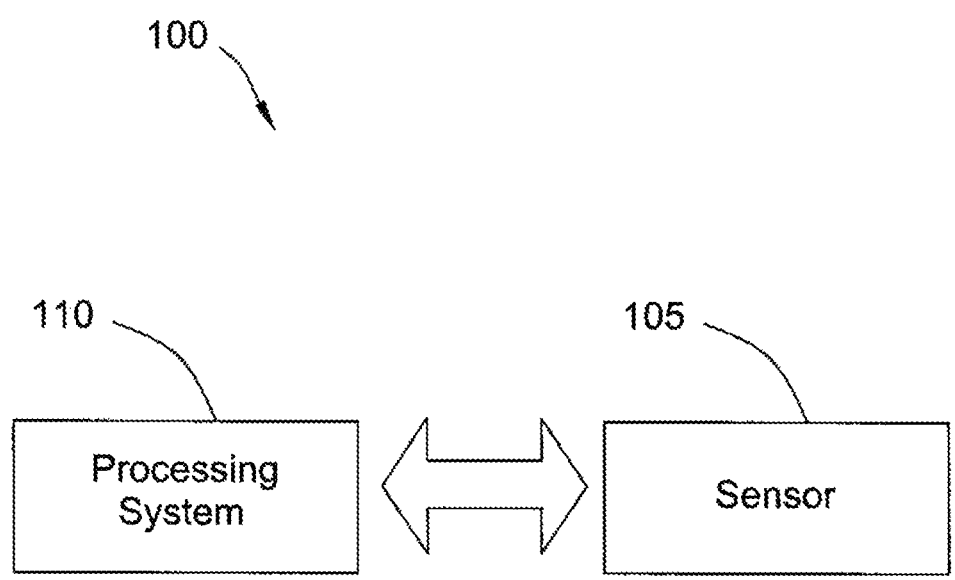
FIG. 1 is a block diagram of an exemplary input device and processing device.

FIG. 1 is a block diagram depicting an example input device 100. The input device 100 may be configured to provide input to an electronic system. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and in various embodiments; the reference voltage may be system ground.

Some capacitive implementations utilize "mutual capacitance" (or "transcapacitance") sensing methods based on changes in the capacitive coupling between sensor electrodes. This may be referred to as a transcapacitive sensor. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). In some embodiments the transmitter electrodes are orthogonal to the receiver electrodes. Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 mm$^2$ or less. In another exemplary embodiment, a partial placement sensor has an imaging area in the range of 20-50 mm$^2$. In some implementations, the partial fingerprint sensor has an input surface that is the same size the imaging area.

As will be apparent from the description which follows, the fingerprint sensor may be operated in different modes. For example, in one mode, the fingerprint sensor may be operated to capture (e.g., image) discriminative features of a fingerprint as described above. In another mode, the fingerprint sensor may be operated to identify only the presence or relative movement of an input object such as a finger, which mode may be a lower power mode.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system for a mutual capacitance sensor device may be configured to drive transmit signals onto transmitter sensor electrodes of the sensor 105, and/or receive resulting signals detected via receiver sensor electrodes of the sensor 105. Further, a processing system for a self capacitance sensor device may be configured to drive absolute capacitance signals onto sensor electrodes of the sensor 105, and/or receive resulting signals detected via those sensor electrodes of the sensor 105.

The processing system 110 may include processor-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, execute a WOF mode, and the like.

In some embodiments, the sensing region of the input device 100 may overlap part or all of an active area of a display device, for example, if the sensor 105 also provides a touch screen interface. The display device may be any suitable type of dynamic display capable of displaying a visual interface to a user, including an inorganic LED display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device. In certain embodiments, the sensing region of the input device 100 is used for multiple functions such as fingerprint sensing and navigational control, e.g., via detection of gestures and the like.

Figure 2:
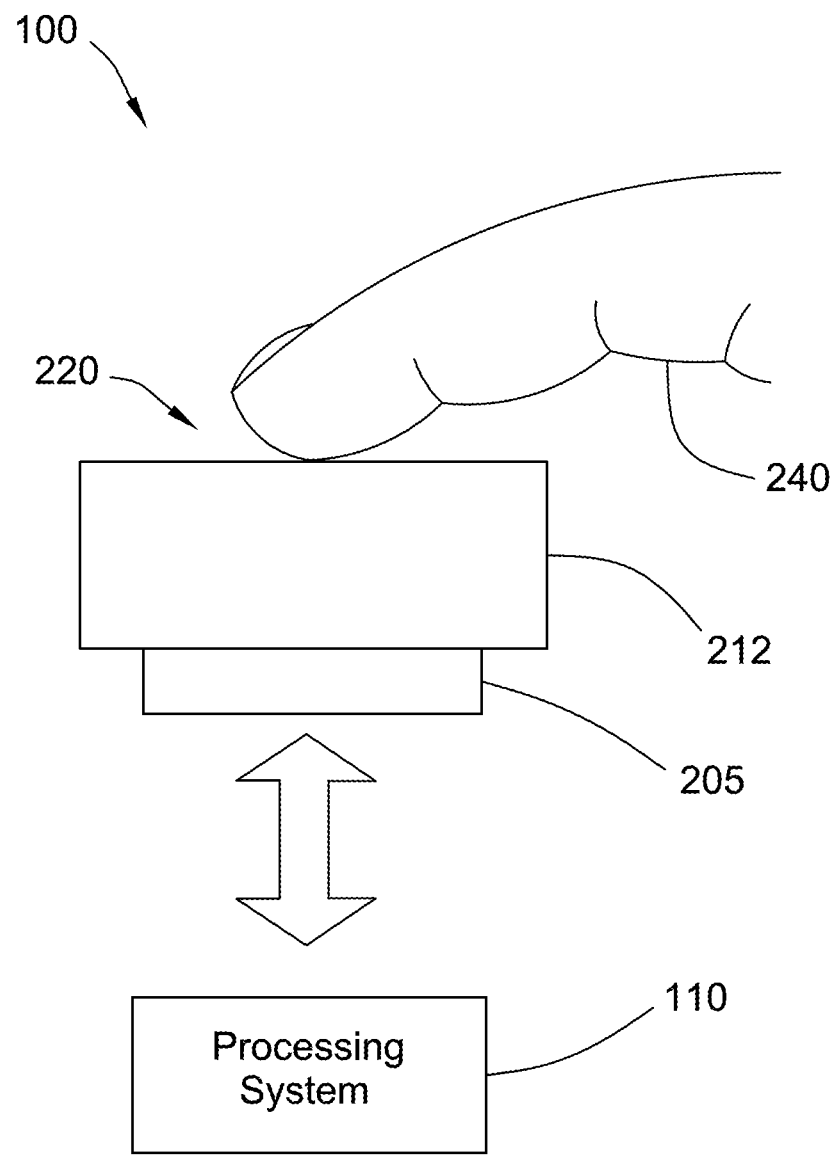
FIG. 2 is a block diagram of certain components of an exemplary sensor.

In FIG. 2, the input device 100 is shown as including a fingerprint sensor 205. The fingerprint sensor 205 is configured to capture a fingerprint from an input object such as finger 240. The fingerprint sensor 205 may be disposed underneath a cover layer or protective material 212 that provides an input surface for the fingerprint to be placed on or swiped over the fingerprint sensor 205. The sensing region 220 may include an input surface with an area larger than, smaller than, or similar in size to a full fingerprint. The fingerprint sensor 205 has an array of sensing elements (e.g., transmitter and receiver electrodes) with a resolution configured to detect surface variations of the finger 240 as previously described. In certain implementations, the fingerprint sensor 205 can be used as a touch sensor for navigation. It will be understood that the sensor 205 may be disposed at any suitable location on the device 100. For example, in the context of a mobile device such a phone, the sensor 205 may be disposed near or integrated with a display, or may be disposed on a side, back, or bottom of the device.

Figure 3:
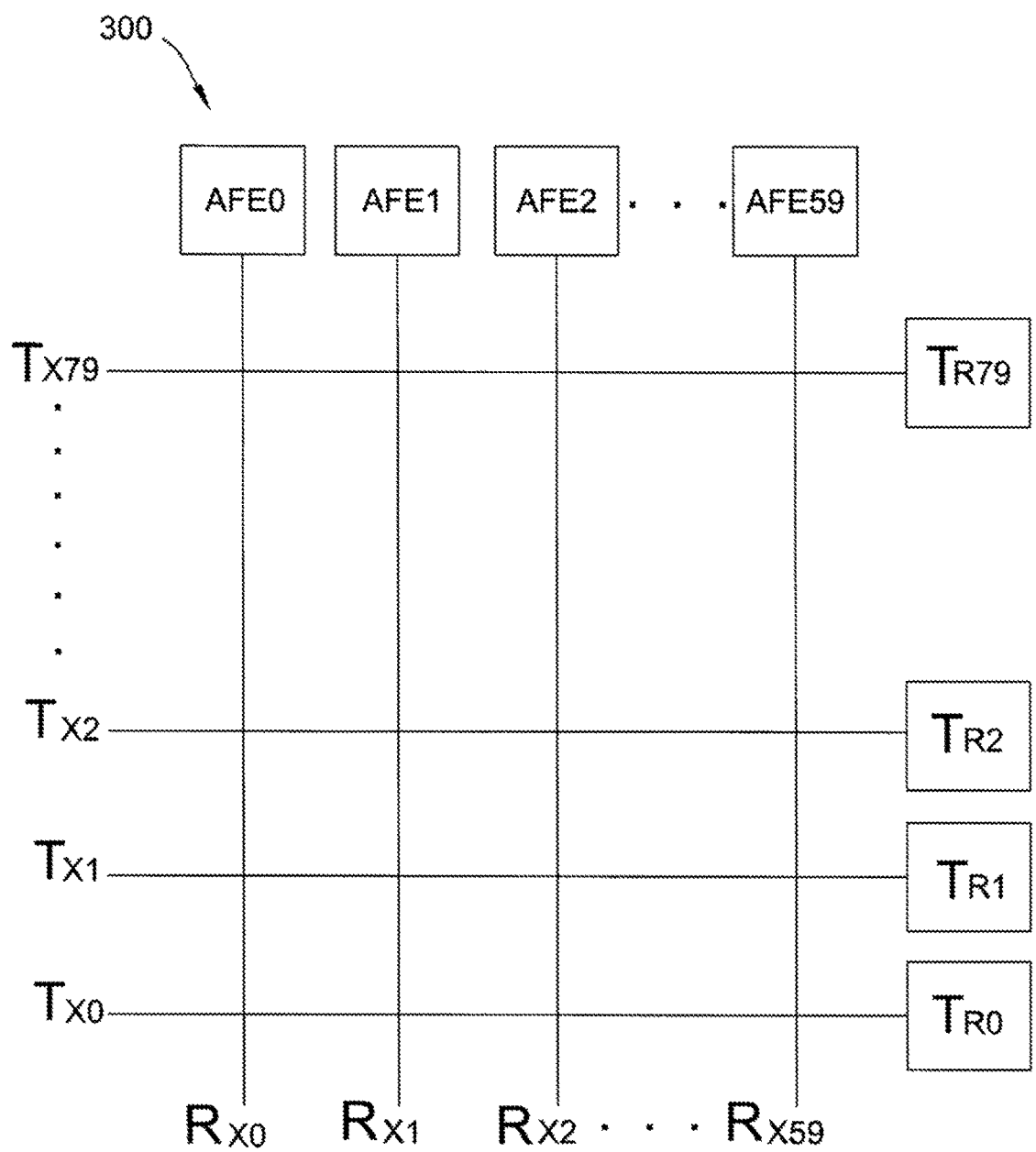
FIG. 3 is a schematic diagram of a certain components of an exemplary capacitive sensor having transmit and receive electrodes.

FIG. 3 illustrates one embodiment of a fingerprint sensor 300 using, for example, capacitive input for imaging an input object such as a fingerprint. The sensor 300 may also be used for other purposes such as navigation by, for example, detecting movement of, or gestures associated with, the input object and may be placed in a WOF mode as described in connection with FIG. 6.

The sensor 300 includes a plurality of transmitter electrodes, labelled $T_{x0}$-$T_{x79}$. The sensor 300 also includes a plurality of receiver electrodes, labelled $R_{x0}$-$R_{x59}$. While the illustrated sensor 300 contains 80 transmitter electrodes (or transmitter lines) and 60 receiver electrodes (or receiver lines), it will be appreciated that any number of suitable transmitter electrodes and receiver electrodes may be included depending on factors such as the size and pitch of sensor desired.

The sensor 300 further includes transmit circuits, labelled TR0-TR79. In the illustrated embodiment, one transmit circuit corresponds to each of transmitter electrodes, $T_{x0}$-$T_{x79}$. The sensor 300 also includes analog front ends, labelled AFE0-AFE59, with one front end corresponding to each of the of receiver electrodes, $R_{x0}$-$R_{x79}$ in the embodiment shown. As will be described further below, in certain embodiments, one or more sets of a plurality of receiver electrodes can be ganged together with each set being input to a single AFE to facilitate modes such as WOF and navigation.

In certain embodiments, a differential circuit is used to obtain signals from the receiver electrodes. In such an embodiment, when a receiver electrode, e.g., $R_{x0}$, is read, the reading on that receiver line is compared with the average of readings on other receiver lines. For example, when obtaining an output at one or more pixels corresponding to a first receiver line ($R_{x0}$), some or all of the remaining receiver lines may be used as reference lines. A difference between the reading on the receiver line $R_{x0}$ and the average of the readings on the remaining reference receiver lines is obtained and amplified via a low-noise amplifier (LNA) in the processing system 110. Such differential reading, in the context of fingerprint imaging, helps to subtract out noise. As described below, the differential circuits in the analog front ends, AFE0-AFE59, can be implemented in the analog or digital domains. In one mode, all (or a majority) of the sensor's transmit and receive electrodes are used. This mode maximizes the resolution of the sensor and can be used as described above for imaging a biometric object, such as a fingerprint.

It will be appreciated that, in some implementations, one transmitter electrode may be driven at a time and only one receiver electrode (and hence one pixel of a receiver line) is measured at a time. In other implementations (e.g., those utilizing multiple simultaneous drive or code-division multiplexing (CDM)), multiple transmission lines may be driven at a time and thus measurements may be taken for multiple or all pixels of a receiver line at a time. In further implementations, in addition to driving multiple transmission lines at a time, multiple receiver lines may be measured at a time.

Figure 4:
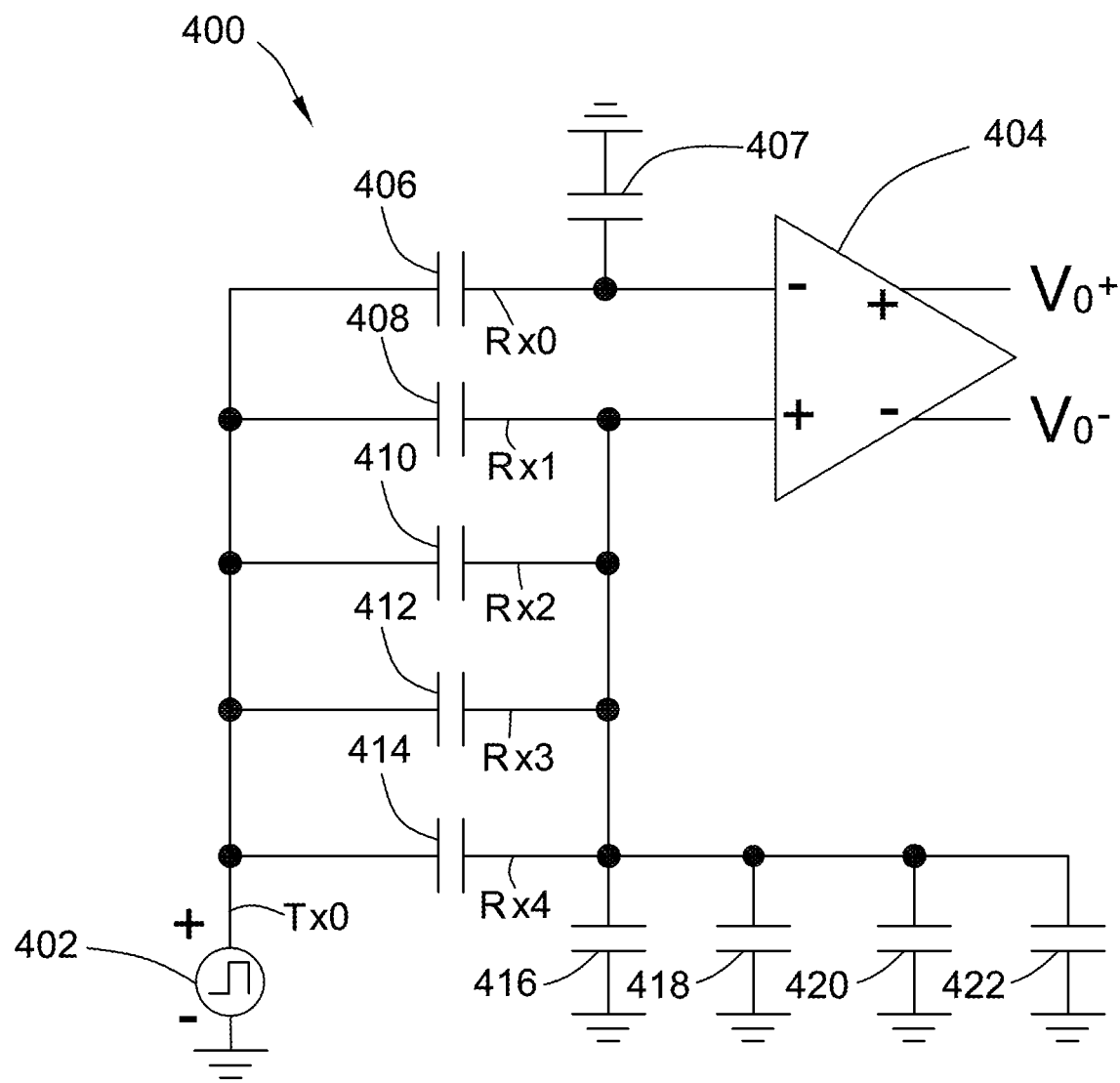
FIG. 4 is a schematic illustration of an exemplary embodiment of an analog front end and corresponding inputs of a capacitive sensor.

FIG. 4 illustrates one embodiment of an analog front end 400 of a sensor, including inputs comprising a plurality of receiver electrodes, a transmitter electrode, and representative capacitances. In some embodiments, the circuit illustrated in FIG. 4 can be used for fingerprint imaging. In the particular example, one transmitter electrode, labelled $T_{x0}$, connects to a transmit driver circuitry 402. The digital power source 402 drives a sensing signal, $V_{INT}$ onto transmitter electrode $T_{x0}$.

In the illustrated embodiment, receiver electrode, $R_{x0}$ is the receiver electrode being measured. $R_{x0}$ is illustrated connecting to the negative terminal of low-noise amplifier ($A_{LNA}$) 404. $R_{x0}$ connects to the $A_{LNA}$ 404 through a capacitance 406. For example, capacitance 406 may be a ridge capacitance ($C_R$) on the order of 100 aF (attofarad). $R_{x0}$ also has a background capacitance ($C_B$) 407 on the order of, for example, 1 pF (picofarad).

For simplification, each of $R_{x1}$-$R_{x4}$ are illustrated grounded together. However, in some embodiments, each receiver electrode connects to its own analog front end in a manner similar to $R_{x0}$ in FIG. 4. Through switches, the receiver electrodes can then be connected together in varying numbers as an averaged reference signal. In FIG. 4, $R_{x1}$-$R_{x4}$ are illustrated acting as the averaged reference signal. The averaged reference signal from the reference lines will typically fall somewhere between the measured signal level for a ridge or for a valley, since the reference lines are covered by a mixture of ridges and valleys. Thus, the configuration shown in FIG. 4 generally allows for the processing system 110 to distinguish between ridges and valleys at each pixel while mitigating the effects of environmental noise (since the same environmental noise is present at the receiver line being read as is present at the other receiver lines providing the reference).

In the illustrated embodiment, $R_{x1}$-$R_{x4}$ include a capacitance 408, 410, 412, and 414 respectively. For illustrative purposes, 408 and 412 may be valley capacitances ($C_v$) while 410 and 414 may be ridge capacitances ($C_R$). Each of the capacitances 408, 410, 412, and 414 also represent the baseline trans-capacitive in addition to any valley and ridge capacitances. Each of $R_{x1}$-$R_{x4}$ also include a background capacitance ($C_B$), 416, 418, 420, and 422 respectively. $R_{x1}$-$R_{x4}$ are connected to the positive terminal of $A_{LNA}$ 404. The output of LNA 404 is $V_{out}$ which equals Vo+−Vo−.

$A_{LNA}$ 404 measures the difference between capacitance 406 and the average of all capacitances 408-414 on the ganged electrodes $R_{x1}$-$R_{x4}$. Thus, in the illustrative example, $V_{OUT} \approx V_{INT} \cdot A_{LNA} \cdot [C\ 408-0.25 \cdot (C\ 408+C\ 410+C\ 412+C\ 414)]/C_B$ 407.

Figure 5:
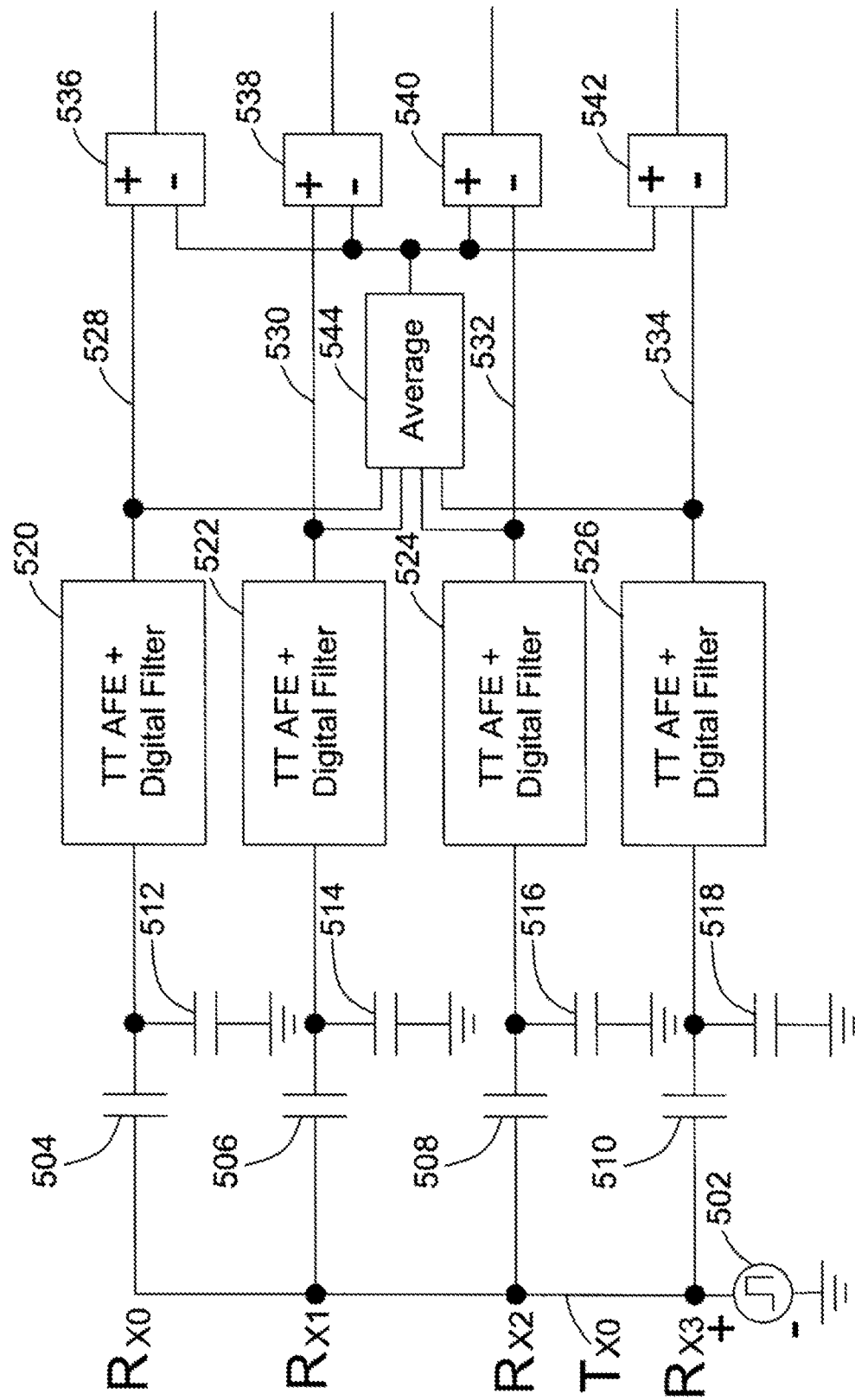
FIG. 5 is a schematic of another exemplary analog front end and corresponding inputs of a capacitive sensor.

As illustrated in FIG. 5, the differential signaling in FIG. 4 can alternatively be done in the digital domain. Transmitter electrode $T_{x0}$ connects to a transmit driver circuitry, labelled 502. Driver circuitry 502 drives a sensing signal $V_{INT}$ onto transmitter electrode $T_{x0}$.

In the illustrated embodiment each of, $R_{x0}$-$R_{x3}$ include a capacitance 504, 506, 508, and 510 respectively. For illustrative purposes, 504 and 508 may be valley capacitances ($C_v$) while 506 and 510 may be ridge capacitances ($C_R$). Each of $R_{x0}$-$R_{x3}$ also include a background capacitance ($C_B$), 512, 514, 516, and 518 respectively. Capacitance values 504-510 are converted to digital signals at an analog front end (AFE) and digital filter, 520, 522, 524, and 526. The filter can be a low pass, high pass or band pass filter depending on the application.

The digital outputs of the AFEs and digital filters are then connected to a subtractor. Digital outputs 528, 530, 532, and 534 (corresponding to $R_{x0}$-$R_{x3}$) are each connected to the positive terminal of subtractors 536, 538, 540, and 542 respectively. Each of the digital outputs are also connected to a circuit 544 for averaging the digital outputs. The average circuit 544 then connects to the negative terminal of each of the subtractors 536, 538, 540, and 542. Thus, a receiver electrode is digitized and the average of all digitized receiver electrodes is subtracted from it. In this way, a digital equivalent to the AFE including differential signaling of FIG. 4 is provided.

Thus, the analog circuit as shown in FIG. 4 or the digital circuit as shown in FIG. 5 can be used as the AFE circuits illustrated in FIG. 3. As discussed above, FIG. 3 illustrates a simplified layout of receiver and transmitter lines. However, each of the receiver electrodes can be routed to various AFEs through switches. FIG. 4 and FIG. 5 provide embodiments with multiple receiver electrodes routed to a single AFE to cancel noise.

Figure 6:
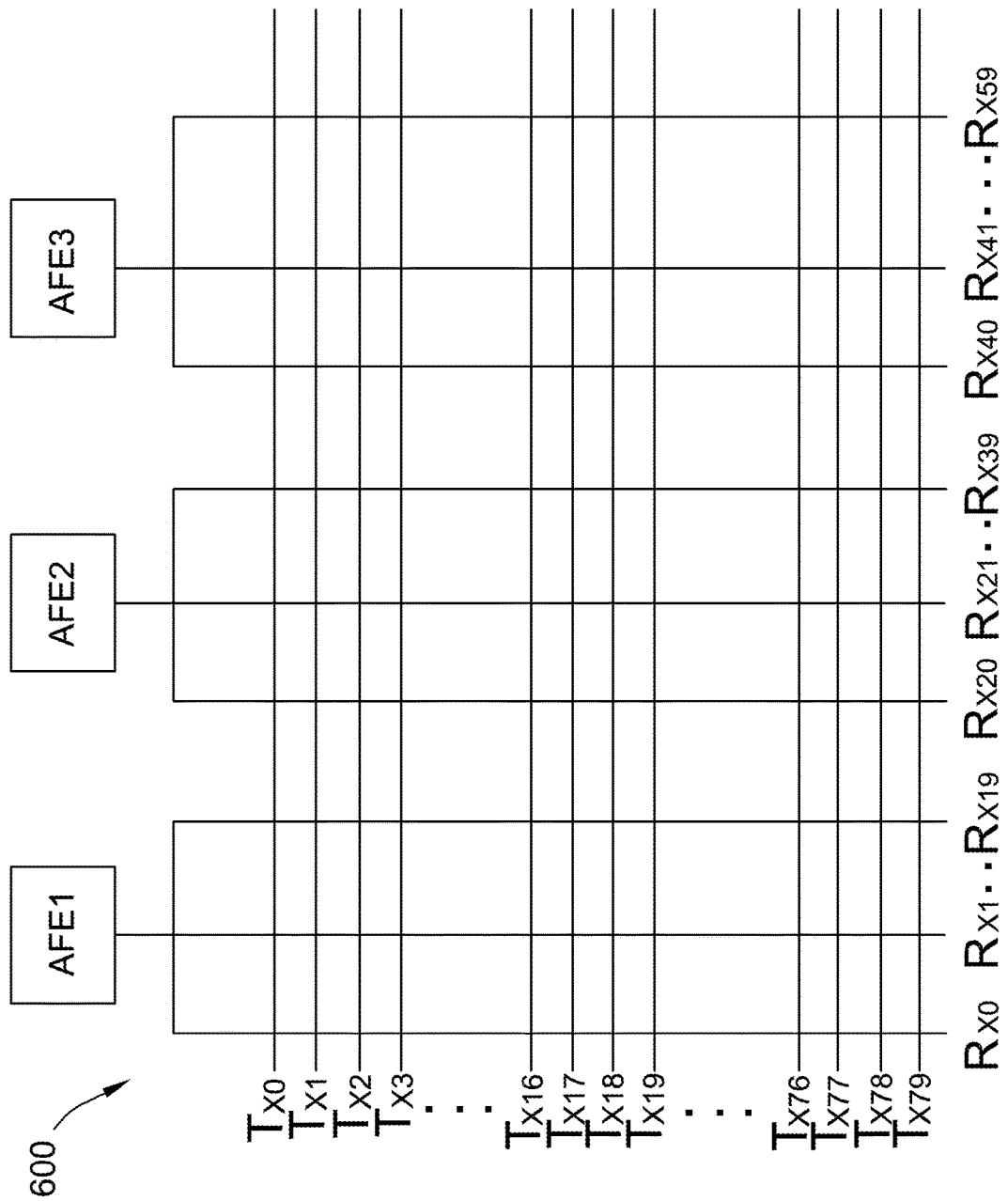
FIG. 6 depicts an arrangement of a sensor including analog front ends with each front end connected to a plurality of receiver electrodes.

FIG. 6 illustrates a sensor 600 with transmitter electrodes $T_{x0}$-$T_{x79}$ and receiver electrodes $R_{x0}$-$R_{x59}$, which arrangement is suitable for use in modes such as WOF and navigation. The arrangement may be implemented by, for example, ganging or otherwise interconnecting electrodes shown in connection with FIG. 3 using switching techniques as shown and described in connection with FIGS. 7-8.

As discussed above, the number of receiver and transmitter electrodes can vary depending on the sensor and application, e.g., depending on the sensor size and electrode pitch. In the embodiment illustrated in FIG. 6, receiver electrodes $R_{x0}$-$R_{x19}$ are ganged and collectively input into a single analog front end, labeled AFE1. Each group of ganged receiver electrodes results in a common detected signal at each of the AFEs. AFE1 may, for example, contain a differential circuit or digital equivalent as described above. In some alternative embodiments, however, AFE1 is a single-ended circuit. A single ended circuit maximizes the signal received at the AFE. For example, in the differential sensing process described in connection with FIG. 4-5, the capacitance differences between the ridges and valleys of a finger may be on the order of approximately 1 fF (femtofarad). However, a total single-ended change in capacitance when a finger touches the sensor 600 may be on the order of approximately 100 fF.

The location and number of specific receiver electrodes which may be ganged together may be varied depending on the desired mode. For example, in one mode, sensor 600 operates with only receiver electrodes towards the center of sensor 600 ganged together. For example, receiver electrodes $R_{x20}$-$R_{x39}$ are ganged together as input to analog front end, AFE2. The remaining receiver electrodes and AFEs are not required when the sensor is operated in this mode. Therefore, the sensing area is approximately at the center of sensor 600. This mode may be used to detect the presence of a finger, such as in a WOF mode. Similarly, in this mode, only a subset of transmitter electrodes need to be used. For example, $T_{x30}$-$T_{x49}$ may be used thereby using both the transmit and receive electrodes towards the center of the sensor array. The transmit electrodes employed, e.g., $T_{x30}$-$T_{x49}$, can be physically or logically ganged together. When physically ganged together, one driver circuit connects to the transmit electrodes used through switches. When logically ganged together, each transmit electrode may have its own transmit driver circuit (for example as illustrated in FIG. 3), with each transmit drive circuit providing the same sensing signal onto the transmit electrodes at the same time. In this way, physically and logically ganging the transmit electrodes is equivalent.

In the exemplary mode described above, the sensor 600 would detect the presence of a finger near the approximate center of the sensor. Because a finger is more likely to touch the middle of the fingerprint sensor, all of the sensor's transmit and receive electrodes do not need to be active. The device can then wake-on-finger (WOF) and enter a second mode wherein all receiver electrodes are used with individual AFEs to image a finger as described above. By limiting the transmit and receive electrodes used during the WOF mode, the power required for the sensor is reduced until a finger is detected at which time the device can then wake to image the finger.

In another embodiment or mode, multiple AFE's (e.g., AFE1, AFE2 and AFE3) are used with the sensor in a low power state. It will be appreciated that although 3 AFEs are illustrated and described in FIG. 6, more or fewer AFEs may be used depending on the application. When operating in this mode, groups of receive electrodes are ganged together and input into each of the AFEs. For example, in the embodiment shown in FIG. 6, the ganged $R_{x0}$-$R_{x19}$ are input to a single analog front end, AFE1, ganged $R_{x20}$-$R_{x39}$ are input into a single analog front end, AFE2, and ganged $R_{x40}$-$R_{x59}$ are input into a single analog front end, AFE3. In this mode, the receiver electrodes ganged and input into each AFE can be read separately thereby permitting, for example, the movement of an input object such as a biometric object, to be tracked across the ganged receiver electrodes. Tracking movement of an input object (e.g., up, down, right, left and other gestures) is useful in a variety devices, such a smart phone or tablet to accomplish a variety of tasks. This mode facilitates such navigation because the capacitance at each of the AFEs will vary with the moving finger or other object.

Although this mode may use more power than using a single AFE as described above, it consumes less power than using individual receiver electrodes each with its own AFE thereby providing an efficient and low power navigation mode.

Figure 7:
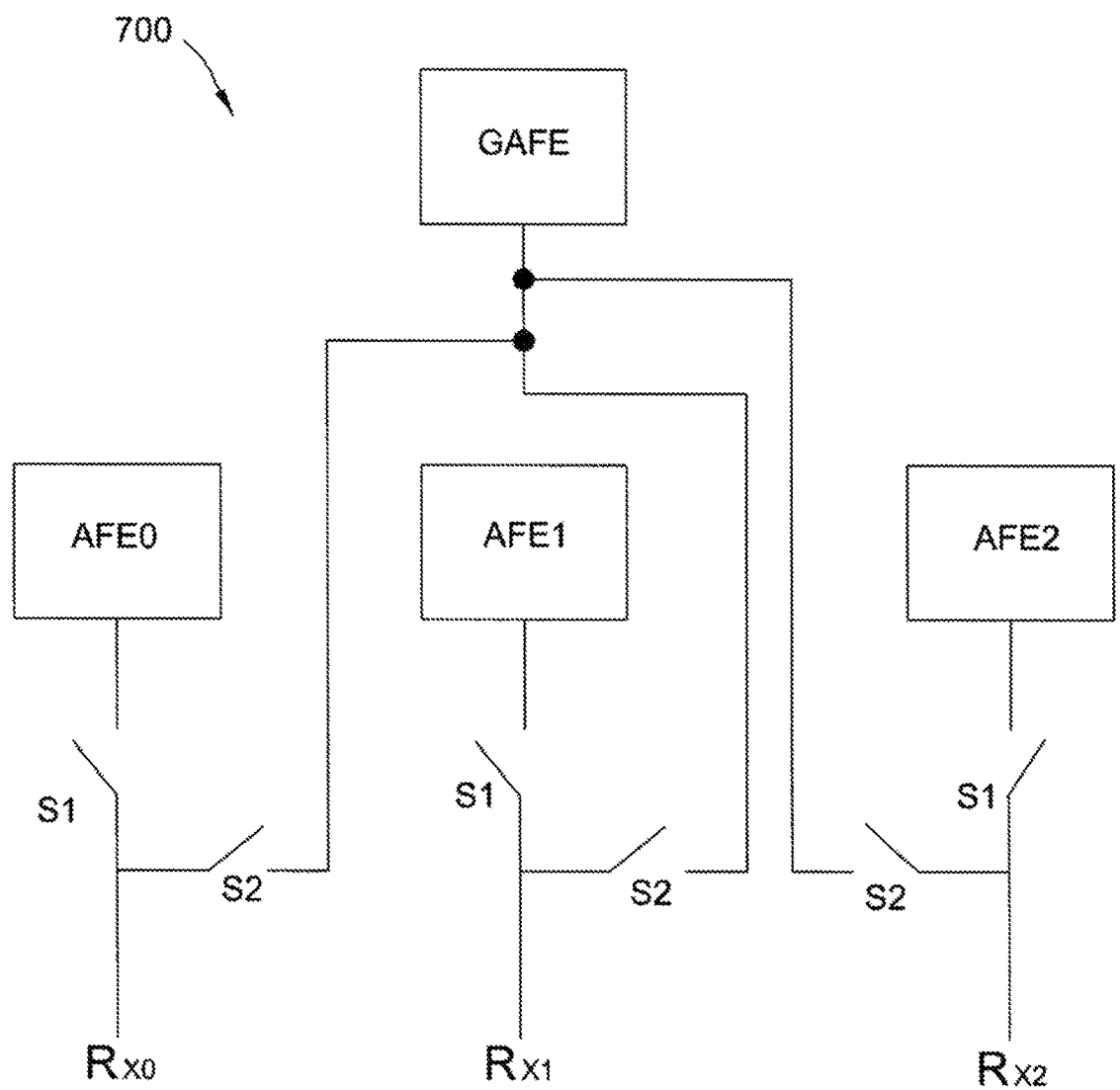
FIG. 7 illustrates a sensor including an arrangement for ganging together a plurality of receiver electrodes.

FIG. 7 illustrates one embodiment of a sensor 700 that facilitates the use of both a series of individual receiver electrodes input to individual AFEs and the same individual receiver electrodes ganged with the ganged electrodes input into a common AFE. For example, in the illustrated embodiment, $R_{x0}$-$R_{x2}$ connect to AFE0-AFE2, respectively, through switches S1. When switches S1 are closed and switches S2 are open, the sensor operates in a first mode (e.g., fingerprint capture or imaging) with the receiver electrodes connected to individual AFEs as described above. In a second mode (e.g. WOF or navigation), switches S1 are open and switches S2 are closed. In this mode, $R_{x0}$-$R_{x2}$ are ganged together and input to a common AFE, here call a ganged analog front end (GFAE). As discussed above, each of the AFEs can be single-ended or differential. In one embodiment, the individual AFEs, e.g., AFE0-AFE2 are differential, and the common AFE, e.g., GAFE, is single ended.

Figure 8:
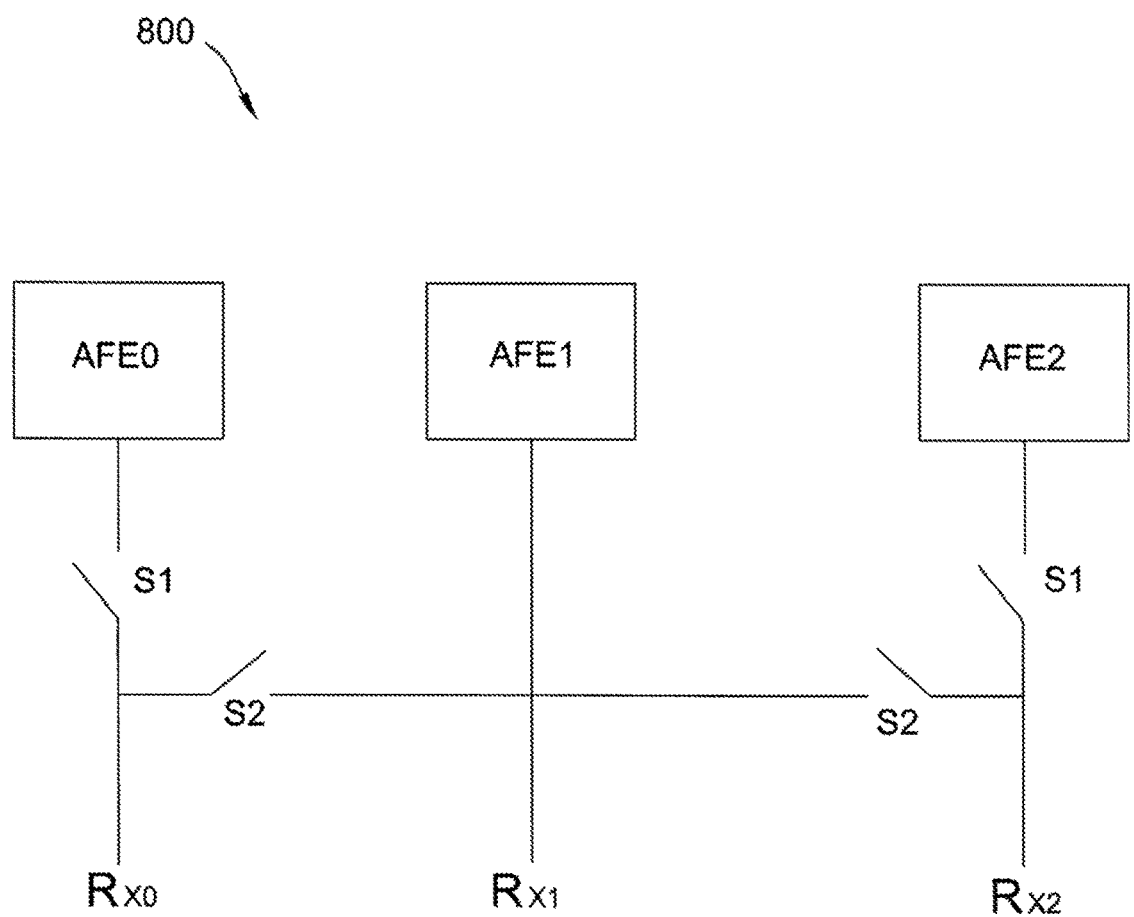
FIG. 8 illustrates an alternative embodiment for ganging together a plurality of receiver electrodes.

FIG. 8 illustrates an alternative embodiment of a sensor 800 that facilitates using both receiver electrodes individually and in a ganged state. In the illustrated embodiment, $R_{x0}$-$R_{x2}$ connect to AFE0-AFE2, respectively, through switches S1. When switches S1 are closed and switches S2 are open, the sensor operates in a first mode with the receiver electrodes connected to individual AFEs similar to the manner described in connection with FIG. 7. In a second mode, switches Si are open and switches S2 are closed. In this mode, $R_{x0}$-$R_{x2}$ are ganged together and are collectively input to the analog front end for AFE1. As discussed above, each of the AFEs can be single-ended or differential. In one embodiment, the individual AFEs, AFE0-AFE2 are differential. However, when switches S2 are closed and $R_{x0}$-$R_{x2}$ are ganged together, AFE1 may optionally be configured to operate in a single ended mode.

The various modes and configurations described above can also be used to detect the force being applied to a sensor. In one embodiment, force is detected by using a single-ended measurement of ganged transmit and receive sensor electrodes, as described above. A single-ended measurement is beneficial because it allows the measurement of the absolute capacitance resulting from the presence of a ridge or a valley. The ganging of electrodes is beneficial because, as described above, the measured signal increases as more ridges and valleys are included in the measurement.

Figure 9A:
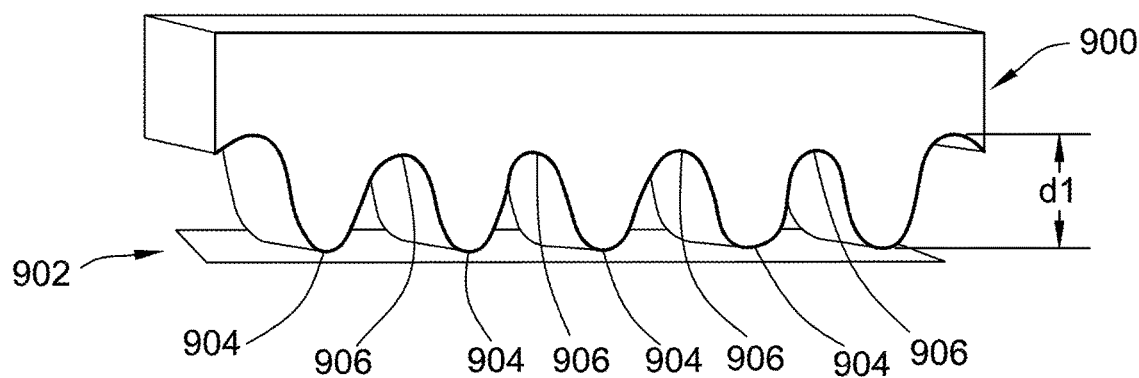
FIG. 9A illustrates an input object contacting a sensor according to one embodiment.
Figure 9B:
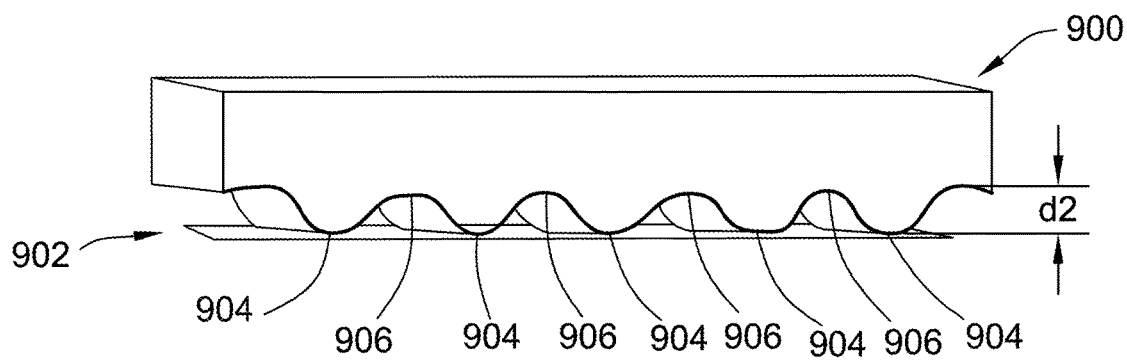
FIG. 9B illustrates an input object contacting a sensor according to one embodiment.

Measurement of force is illustrated and described with reference to the examples of FIGS. 9A-9B. FIG. 9A illustrates an input object having ridges and valleys, such as a finger, 900 pressed softly on a surface of a sensor 902. As can be seen, the distance ($d_1$) between ridges 904 and valleys 906 is relatively large. Using a differential AFE, during a soft press, the measured capacitance will be approximately half the difference in capacitance between a ridge and a valley. During a hard press of the finger 900, the distance ($d_2$) between ridges 904 and valleys 906 is relatively small, as illustrated in FIG. 9B. When using a differential measurement, the measured capacitance will converge towards zero because a relatively flat surface is touching the sensor as a result of the ridges being effectively pressed into the valleys. Therefore, the same capacitance appears on both terminals of an ALNA, such as the one shown in FIG. 4, thereby appearing as though no finger is present.

As previously described, a single-ended AFE measures the absolute capacitance on a pixel and thus, in the simplest case, measures the capacitance of a ridge or a valley. During a soft press (FIG. 9A), each pixel will reflect the corresponding ridge/valley capacitance measurement. During a hard press (FIG. 9B), all pixels will tend towards the same capacitance measurement (ridge) and thus the measured capacitance value will increase on pixels that were valleys during a soft press. The increase in measured capacitance allows the measure of force. Relative force can be detected and measured by determining the amount the measured capacitance has increased.

Therefore, in some embodiments, imaging a fingerprint is done in a first mode, using differential signaling. Detecting force is done in a second mode, using single ended signaling.

While the above embodiments are shown with a trans-capacitive sensor, this disclosure applies to various sensor types, including, for example, matrix sensors.

Figures 10A, 10B:
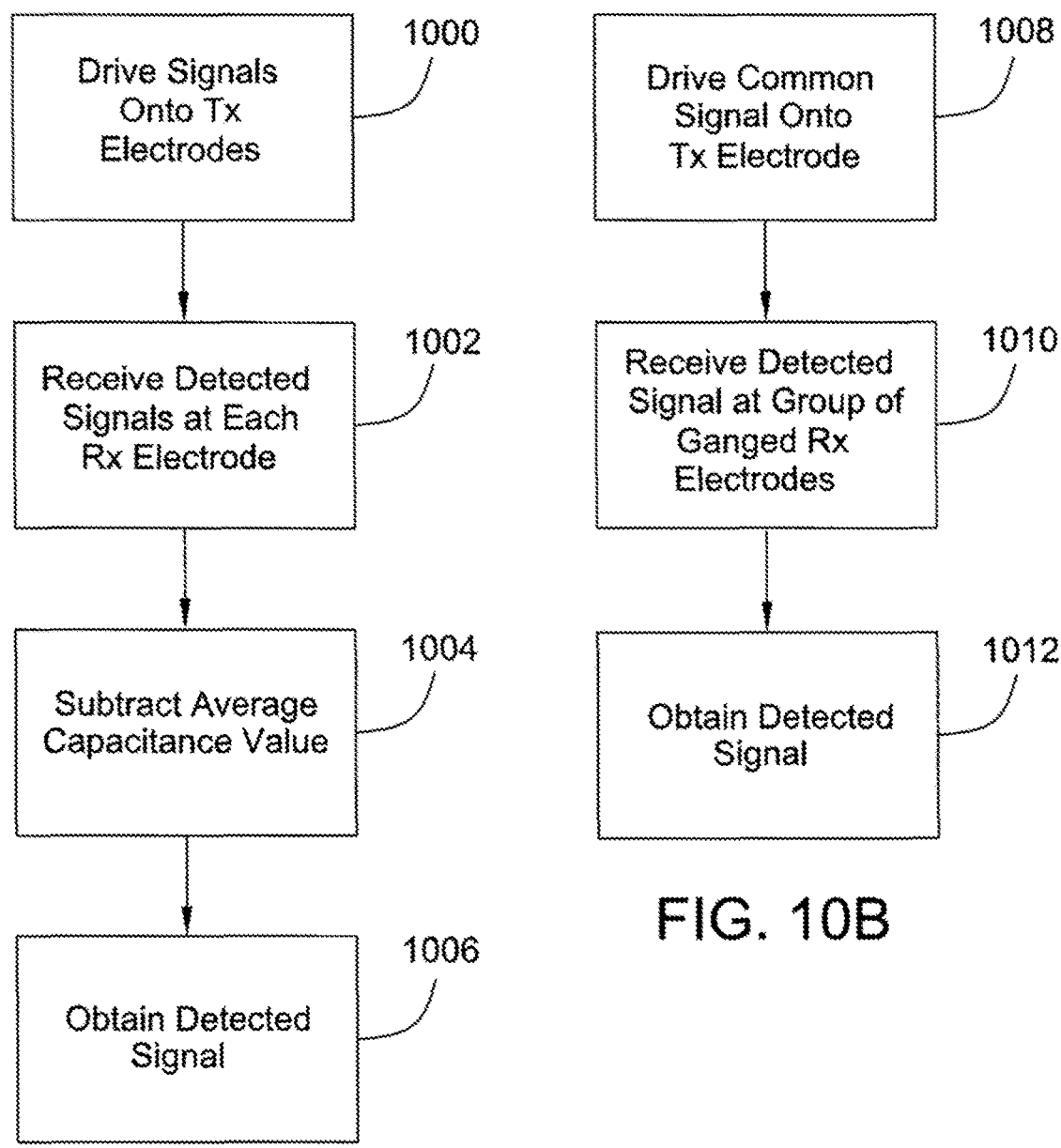
FIG. 10A illustrates a method of operating a sensor according to one embodiment.
FIG. 10B illustrates a method of operating a sensor according to another embodiment.

FIG. 10A illustrates a method of operating a sensor wherein receiver electrodes of the sensor operate in a differential mode during fingerprint imaging. At step 1000 the processing system drives sensing signals onto each of a plurality of transmitter electrodes. The sensing signals can be driven from a common driver circuit with the transmitter electrodes ganged together. Alternatively, each transmitter electrode can have an individual driver circuit and each driver circuit can drive the same signal onto each of the plurality of transmitter electrodes. At step 1002, the processing system receives detected signals at each of the plurality of receiver electrodes. At step 1004, an average of capacitance values measured from at least two receiver electrodes is subtracted from a receiver electrode of interest. At step 1006, the processing system obtains a detected signal of interest. When operating in this mode, the sensing signals may be driven onto each of the transmitter electrodes and separate detected signals corresponding to each of the plurality of receiver electrodes maybe repeatedly received in order to image a biometric object.

FIG. 10B illustrates a method of operating a sensor in a single ended mode. At step 1008, the processing system drives a common sensing signal onto a plurality of the transmitter electrodes. At step 1010, a common detected signal corresponding to at least one receiver electrode is received. Alternatively, at step 1010, the common detected signal may correspond to a group of at least two or more ganged receiver electrodes. At step 1012 a detected signal from the group of ganged receiver electrodes is obtained. In some embodiments, the processing system can operate in a first differential mode at some times and then operate in a second, single ended mode at other times. In some applications, when operating in this mode, the common sensing signal is driven onto the transmitter electrodes and the common detected signal corresponding to the first group of ganged receiver electrodes is received until a biometric is detected.

Additionally, when operating in the mode illustrated in FIG. 10B, at step 1008 at least a second common signal sensing signal may be repeatedly driven onto a second group of the transmitter electrodes and a second common detected signal corresponding to a second group of ganged receiver electrodes may be received at step 1010. At step 1012 a movement of a biometric from the plurality of the based on the common detected signal and second common detected signal may be detected. The common sensing signal and the second common sensing signal may be driven in at least one of time multiplexed and code multiplexed manner.

In one embodiment, the processing system operates in a first, differential mode to image fingerprints (e.g., FIG. 10A). The processing system operates in a second, single ended mode to detect the presence of a finger, detect movement of a finger for navigation, and/or detect the pressure or force applied to a sensor by a finger (e.g., FIG. 10B).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for capacitive sensing, the input device comprising:
    a plurality of transmitter electrodes; and
    a plurality of receiver electrodes;
    wherein the input device includes driver circuitry configured to:
        operate in a first mode by driving sensing signals onto each of the transmitter electrodes and receiving separate detected signals corresponding to each of the plurality of receiver electrodes;
        operate in a second mode by driving a common sensing signal onto a plurality of the transmitter electrodes and receiving a common detected signal corresponding to at least one receiver electrode selected from the plurality of receiver electrodes;
    a plurality of differential receivers, configured to obtain the separate detected signals when operating in the first mode; and
    at least one single ended receiver, configured to obtain the common detected signal when operating in the second mode;
    wherein the input device is configured to use the plurality of differential receivers to obtain the separate detected signals when operating in the first mode and use the at least one single ended receiver to obtain the common detected signal when operating in the second mode.

2. The input device of claim 1, wherein the common detected signal corresponds to a plurality of ganged receiver electrodes.

3. The input device of claim 1, wherein the differential receivers subtract an average of capacitance values measured from at least two receiver electrodes from a receiver electrode of interest to obtain a detected signal of interest.

4. The input device of claim 3, wherein the at least two receiver electrodes are ganged together and connected to an input terminal of an amplifier and subtracted from the receiver electrode of interest to obtain the detected signal of interest.

5. The input device of claim 1, wherein an average capacitance of at least two receiver electrodes selected from the plurality of receiver electrodes are digitally subtracted from the capacitance of a receiver electrode of interest to obtain a detected signal of interest.

6. The input device of claim 1, wherein the input device is further configured to obtain an image of a biometric object in a sensing area when operating in the first mode.

7. The input device of claim 1, wherein the device is further configured to detect the presence of a biometric object in a sensing area including a first group of ganged receiver electrodes, when operating in the second mode.

8. The input device of claim 7, wherein the first group of ganged receiver electrodes is located proximate to a center of a sensing area.

9. The input device of claim 1, wherein the input device further comprises a plurality of groups of ganged receiver electrodes and wherein the input device is further configured to detect a movement of a biometric object in a sensing area when operating in the second mode with a first group of ganged receiver electrodes selected from the plurality of groups of ganged receiver electrodes.

10. The input device of claim 6, wherein, when operating in the first mode, the input device drives sensing signals onto each of the transmitter electrodes and receives separate detected signals corresponding to each of the plurality of receiver electrodes repeatedly to image a biometric object.

11. The input device of claim 7, wherein, when operating in the second mode, the input device repeatedly drives the common sensing signal onto the plurality of the transmitter electrodes and receives the common detected signal corresponding to the first group of ganged receiver electrodes until a biometric is detected.

12. The input device of claim 9, further comprising:
    when operating in the second mode,
        repeatedly driving at least a second common sensing signal onto a second plurality of the transmitter electrodes and receiving a second common detected signal corresponding to a second group of ganged receiver electrodes; and detecting a movement of a biometric from the plurality of the based on the common detected signal and second common detected signal.

13. The input device of claim 12, wherein the common sensing signal and the second common sensing signal are driven in at least one of time multiplexed and code multiplexed manner.

14. The input device of claim 1, further comprising:
during a first time when operating in the second mode,
    detecting the presence of a biometric by repeatedly driving the common sensing signal onto the plurality of the transmitter electrodes and receiving the common detected signal corresponding to the first group of ganged receiver electrodes until the biometric is detected;
    repeatedly driving at least a second common signal sensing signal onto a second plurality of the transmitter electrodes and receiving a second common detected signal corresponding to a second group of ganged receiver electrodes; and
    detecting a movement of a biometric from the plurality of the based on the common detected signal and second common detected signal; and
when operating in the first mode the input device drives sensing signals onto each of the transmitter electrodes and receives separate detected signals corresponding to each of the plurality of receiver electrodes repeatedly to image a biometric object.

15. The input device of claim 1, wherein the device is further configured to detect a force applied by a biometric object in a sensing area when operating in the second mode.

16. The input device of claim 1, wherein the plurality of transmitter electrodes and the plurality of receiver electrodes form a transcapacitive sensor and the plurality of transmitter electrodes are orthogonal to the plurality of receiver electrodes.

17. An input device for capacitive sensing, the input device comprising:
    a plurality of transmitter electrodes and a plurality of receiver electrodes;
    wherein the input device includes driver circuitry configured to:
        operate in a first mode by driving sensing signals onto each of the transmitter electrodes and receiving separate detected signals corresponding to a plurality of differential receivers, wherein each of the plurality of differential receivers is configured to provide a separate detected signal associated with one of the receiver electrodes; and
        operate in a second mode by driving a sensing signal onto each of the transmitter electrodes and receiving at least one common detected signal at a single ended receiver, wherein the single ended receiver is configured to provide a common detected signal associated with at least one receiver electrode.

18. The input device of claim 17, wherein the differential receivers subtract an average of capacitance values measured from at least two receiver electrodes from a receiver electrode of interest to obtain a detected signal of interest.

19. The input device of claim 18, wherein the at least two receiver electrodes are ganged together and connected to an input terminal of an amplifier and subtracted from the receiver electrode of interest to obtain the detected signal of interest.

20. The input device of claim 17, wherein an average capacitance of at least two receiver electrodes are digitally subtracted from the capacitance of a receiver electrode of interest to obtain a detected signal of interest.

21. The input device of claim 17, further configured to obtain an image of a biometric object in a sensing area when operating in the first mode.

22. The input device of claim 17, further configured to detect the presence of a biometric object in a sensing area including a first group of ganged receiver electrodes, when operating in the second mode, wherein the first group of ganged receiver electrodes are located near the approximate center of a sensing area.

23. The input device of claim 17, wherein the processing system is configured to detect a movement of a biometric object in a sensing area including a plurality of groups of ganged receiver electrodes when operating in the second mode.

24. The input device of claim 17, wherein the plurality of transmitter electrodes and the plurality of receiver electrodes form a transcapacitive sensor and the plurality of transmitter electrodes are orthogonal to the plurality of receiver electrodes.

25. A method of operating an input device for capacitive sensing, the input device comprising driver circuitry a plurality of transmitter electrodes and a plurality of receiver electrodes, the method comprising:
    operating in a first mode, the first mode comprising:
        driving sensing signals onto each of the transmitter electrodes;
        receiving separate detected signals corresponding to each of a plurality of differential receiver electrodes, wherein each of the plurality of differential receivers is configured to provide a separate detected signal associated with one of the receiver electrodes;
    operating in a second mode, the second mode comprising:
        driving a common sensing signal onto each of the transmitter electrodes;
        receiving a common detected signal corresponding to a first group of ganged single ended receiver electrodes, wherein each single ended receiver is configured to provide a common detected signal associated with at least one receiver electrode.

26. The method of claim 25 further comprising subtracting an average of capacitance values measured from at least two receiver electrodes from a receiver electrode of interest to obtain a detected signal of interest.

* * * * *